W. EVANS.
Wagon Spring.
No. 93,978. Patented Aug. 24, 1869.
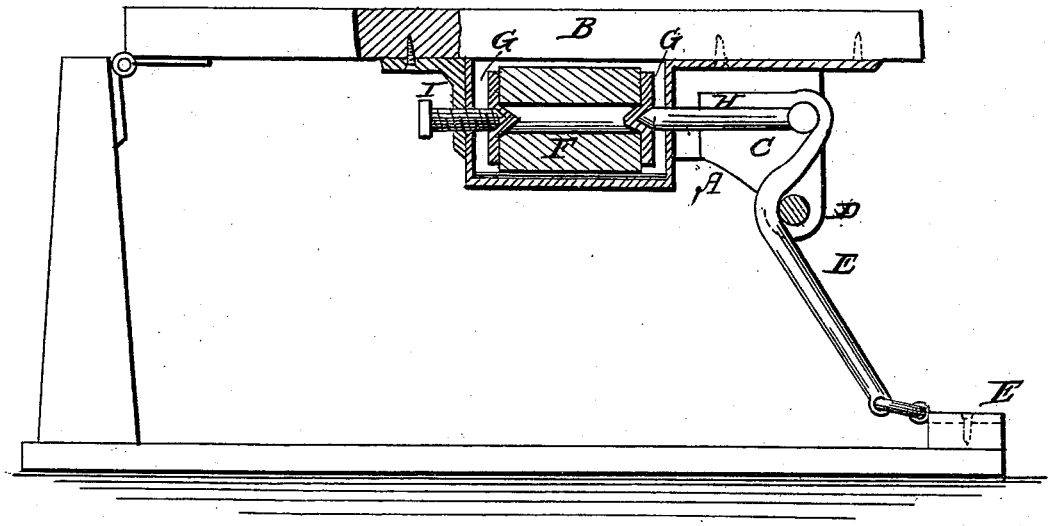

United States Patent Office.

WILLIAM EVANS, OF EUREKA, WISCONSIN.

Letters Patent No. 93,978, dated August 24, 1869.

IMPROVEMENT IN SPRINGS.

The Schedule referred to in these Letters Patent and making part of the same.

*To all whom it may concern:*

Be it known that I, WILLIAM EVANS, of Eureka, Winnebago county, Wisconsin, have invented a new and improved Adjustable Spring; and I do hereby declare that the following is a full, clear, and exact description thereof, which will enable others skilled in the art to make and use the same, reference being had to the accompanying drawings, forming part of this specification.

This invention relates to improvements in springs, whereby it is designed to provide a simple and cheap adjustable spring, especially adapted for wagon-springs, which may be readily adjusted to maintain the proper degree of springing qualities for carrying light or heavy loads.

The drawing represents a longitudinal sectional elevation of my improved spring.

A represents a metallic case arranged to be secured to the bottom of any seat or framing, B.

At one end of the said case are brackets C, supporting a transverse bar, D, as a fulcrum for a lever to project downward, and connected at its long arm by a link connection to the fixed support E of the spring.

Within the case is provided a cylindrical or other-formed rubber spring F having a socketed plate, G, at each end.

A sliding bolt, H, against the other end of which the short arm of the lever E bears, passes through a hole in the end of the case A and takes into the socket of one of the plates G.

The other end of the spring F is supported on the end of a set-screw, I, tapped through the other end of the case.

The pressure of the load on the seat or frame B causes the sliding bolt H to compress the spring, and if the latter be required to support a great load, it is first compressed to considerable extent by the set-screw I, and thereby made capable of resisting the load without permitting too much movement of the lever E without impairing its springing qualities.

If the load be light, the screw I is made to allow the spring to expand to the required degree of tension, to support the said light load and maintain the proper degrees of flexibility and elasticity.

While I prefer to enclose the spring F in a case, it is not essential to its well working, but any suitable support for the set-screw and bolt H, at the ends of the spring, will accomplish the desired object.

I claim as new, and desire to secure by Letters Patent—

1. The combination, with the spring F, of the set-screw I, sliding bolt H, and lever E, when arranged substantially as specified.

2. The combination of the spring F, case A, set-screw I, sliding bolt H, brackets C, bolt D, and lever E, all arranged as specified.

WILLIAM EVANS.

Witnesses:
WM. M. MARTIN,
EMANUEL HUTT.